United States Patent Office 3,501,475
Patented Mar. 17, 1970

3,501,475
N-AMINOBENZO[6,7]CYCLOHEPTA
[1,2,3,d,e]ISOQUINOLINES
Leslie G. Humber, Dollard des Ormeaux, Quebec,
Canada, assignor to American Home Products
Corporation, New York, N.Y., a corporation of
Delaware
No Drawing. Filed July 17, 1967, Ser. No. 653,635
Int. Cl. C07d 35/36
U.S. Cl. 260—286                                    4 Claims

ABSTRACT OF THE DISCLOSURE

There are disclosed herein the compound N-amino-1,2,3,7,8,12b - hexahydrobenzo[1,2]cyclohepta[3,4,5 - d,e]isoquinoline and its hydrochloride salt, as well as the corresponding N-nitrose compound from which the former compound is prepared. The compounds have antibacterial and trichomonacidal activities and methods for their preparation and use are also given.

This invention is directed to polycyclic aminoisoquinoline derivatives, more particularly, to polycyclic isoquinolines which possess the 1,2,3,7,8,12b-hexahydrobenzo[1,2]cyclohepta[3,4,5-d,e]isoquinoline nucleus and which have an amino group attached to the nitrogen atom of said polycyclic isoquinoline nucleus, as represented generically by the Formula I,

I.

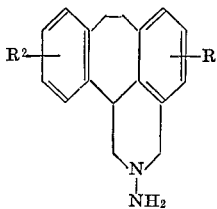

in which $R^1$, and $R^2$ may be hydrogen, or alternatively, $R^1$ and $R^2$ may represent one or more substituents on an aromatic ring, such substituents including lower alkyl, halogen, hydroxyl, alkylthio, and trihalomethyl. This invention is also directed to the salts of the compounds of Formula I with pharmacologically acceptable acids.

The compounds described herein of Formula I, as well as their salts with pharmacologically acceptable acids, possess useful pharmacological properties, and this invention is also directed to formulations containing them. Thus, the compounds described herein possess antibacterial and trichomonacidal activities and are useful as antibacterial and trichomonacidal agents for topical application. As antibacterial agents they are effective against certain gram-positive and gram-negative organisms such as, for example, *Staphylococcus pyogenes* (both penicillin-sensitive and penicillin resistant strains), *Sarcina lutea*, *Streptococcus faecalis*, *Escherichia coli*, *Salmonella pullorum*, *Proteus mirablis*, and *Proteus vulgaris*. They may be used in ointments, creams or lotions containing from 0.1–1.0 percent of the active ingredient for topical application.

As trichomonacidal agents, the compounds of this invention are active against *Trichomonas foetus* and may be formulated in the form of vaginal inserts or creams containing from 0.05 to 1 percent of the active ingredient, for topical application.

This invention is, furthermore, directed to a process for the preparation of the compounds of Formula I. The required starting materials may be obtained as described by L. G. Humber et al. in the Journal of Heterocyclic Chemistry, vol. 3, p. 247, 1966. They are 1,2,3,7,8,12b-hexahydrobenzo[1,2]cyclohepta[3,4,5-d,e]isoquinolines of Formula II wherein $R^1$ and $R^2$ have the significance described above, and by treatment of these compounds, dissolved in 2-propanol, with 2 N hydrochloric acid, and then with an alkali metal nitrite at an elevated temperature, for example, between 30° C. and 100° C., there are obtained N-nitroso-1,2,3,7,8,12b-hexahydrobenzo[1,2]cyclohepta[3,4,5 - d,e]isoquinolines of Formula III, wherein $R^1$ and $R^2$ have the same significance described above.

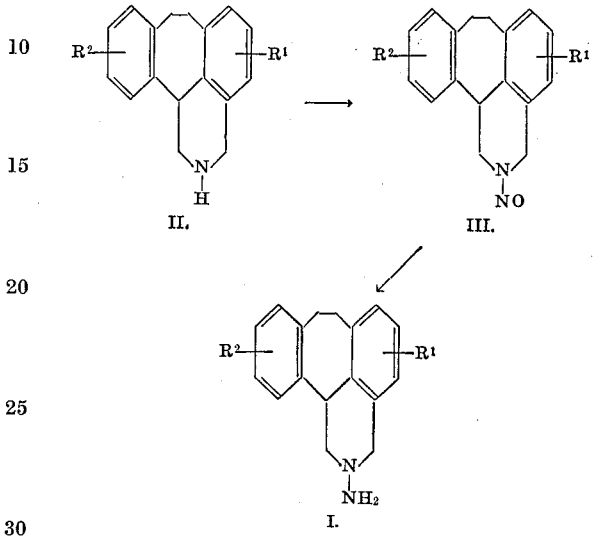

Reduction of the compounds of Formula III yields the compounds of Formula I. The reduction may be accomplished by the use of an acid and a metal combination capable of generating hydrogen, such as, for example, iron and hydrochloric acid; or, by the use of lithium aluminium hydride. The compounds of Formula I may then be converted to salts thereof by treatment with a pharmacologically acceptable acid, in a suitable solvent.

The following examples will further illustrate the process.

EXAMPLE 1

N-nitroso-1,2,3,7,8,12b-hexahydrobenzo[1,2]cyclohepta[3,4,5-d,e]isoquinoline 1,2,3,7,8,12b - hexahydrobenzo[6,7]cyclohepta[1,2,3-d,e]isoquinoline (25 g.) is dissolved in a mixture of 250 ml. of refluxing 2-propanol and 200 ml. of 2 N-hydrochloric acid. The mixture is cooled to 17° C. and the hydrochloride of the starting material begins to precipitate. Sodium nitrite (12.5 g.) in 60 ml. of water is added. There is no evidence of gas evolution and the mixture is heated to 65° C. An additional 6 g. of sodium nitrite is added in 30 ml. of water and 50 ml. of 2-propanol. The mixture is heated and stirred overnight at 75° C., then diluted with 2 liters of water and extracted with chloroform. The organic phase is washed, dried and evaporated to yield a brown gum which is dissolved in 150 ml. of 1:1 chloroform-benzene and filtered through a column of alumina (100 g.). The light yellow eluate is evaporated and crystallized from benzene-hexane to yield the title compound with M.P. 140–141° C., also identified by elemental analysis.

EXAMPLE 2

N-amino-1,3,7,8,12b-hexahydrobenzo[1,2]cyclohepta[3,4,5-d,e]isoquinoline and hydrochloride salt N - nitroso - 1,2,3,7,8,12b - hexahydrobenzo[1,2]cyclohepta[3,4,5-d,e]isoquinoline (9.5 g., 0.036 mole) obtained as described in Example 1, is dissolved in 200 ml. of tetrahydrofuran containing one equivalent of lithium aluminium hydride (1.38 g., 0.036 mole) and stirred at room temperature for 3 hours. Water (6.2 ml.) is added, the mixture is filtered, and the filtrate is dried and evaporated. The title compound is obtained as a yellow oil characterized by $\nu_{max.}^{chloroform}$ 1465, 2935, and 3000 cm.$^{-1}$ It is dissolved in ether and converted to the hydrochloride salt with ethereal hydrogen chloride. Crystallization from methanol, yields the hydrochloride salt of the title compound, M.P. 238–241° C., also identified by elemental analysis.

I claim:

1. A compound selected from the group which consists of N - amino - 1,3,7,8,12b - hexahydrobenzo[1,2]cyclohepta[3,4,5-d,e]isoquinoline and salts thereof with pharmacologically acceptable acids.

2. N - amino - 1,3,7,8,12b - hexahydrobenzo[1,2]cyclohepta[3,4,5-d,e]isoquinoline, as claimed in claim 1.

3. The hydrochloride salt of N-amino-1,3,7,8,12b-hexahydrobenzo[1,2]cyclohepta[3,4,5 - d,e]isoquinoline, as claimed in claim 1.

4. N - nitroso - 1,2,3,7,8,12b - hexahydrobenzo[1,2]cyclohepta[3,4,5-d,e]isoquinoline.

References Cited

UNITED STATES PATENTS

| 3,037,984 | 6/1962 | Biel | 260—288 X |
| 3,403,157 | 9/1968 | Humber et al. | 260—288 |

DONALD G. DAUS, Primary Examiner

U.S. Cl. X.R.

260—288; 424—258